United States Patent [19]

Maguire

[11] 4,408,938
[45] Oct. 11, 1983

[54] EXPANSION SLEEVE

[76] Inventor: James V. Maguire, 16862 Pacific Coast Hwy., Huntington Beach, Calif. 92649

[21] Appl. No.: 295,724

[22] Filed: Aug. 24, 1981

[51] Int. Cl.³ ............................................. F16B 13/10
[52] U.S. Cl. ...................................... 411/71; 411/34; 411/38; 411/74; 411/57
[58] Field of Search ........................ 411/71, 40, 41, 44, 411/72, 73, 74, 34, 35, 36, 37, 38, 57

[56] References Cited

U.S. PATENT DOCUMENTS

| 734,326 | 7/1903 | Hicks . | |
|---|---|---|---|
| 1,000,715 | 8/1911 | Caywood . | |
| 1,191,151 | 7/1916 | Brush . | |
| 1,476,833 | 12/1923 | Pleister . | |
| 1,476,834 | 12/1923 | Pleister . | |
| 2,292,467 | 2/1940 | Norsell | 85/2 |
| 2,326,855 | 8/1943 | Hathorn | 85/40 |
| 2,718,809 | 9/1955 | Kraft | 85/2 |
| 3,085,463 | 4/1963 | Hallock | 411/34 |
| 3,878,760 | 4/1975 | Jeal et al. | 411/74 |
| 4,089,247 | 5/1978 | Dahl et al. | 411/34 |
| 4,142,439 | 3/1979 | Landt | 411/34 |

FOREIGN PATENT DOCUMENTS 151327 9/1920 United Kingdom .................. 411/30

Primary Examiner—Wayne L. Shedd
Attorney, Agent, or Firm—Gausewitz, Carr, Rothenberg & Edwards

[57] ABSTRACT

An expansion sleeve for attaching objects to a relatively thin panel comprises a hollow headed bolt threaded externally for its full length and threaded internally at an end portion remote from the head. The unthreaded internal portion of the bolt has an inwardly projecting apertured annular shoulder into which a drift pin may be driven to expand the sleeve on the interior side of a panel to which the sleeve is to be attached. A jamb nut pulls the expanded sleeve portion firmly against the inside of the panel member and thereafter a threaded rod is threaded into the interior threads of the sleeve so that a nut on the threaded rod may be tightened against the sleeve head. This draws the inner end of the sleeve toward the panel member to increase the pressure of the expanded sleeve portion against the panel. An object to be attached to the panel is then connected to the protruding end of the threaded rod.

7 Claims, 5 Drawing Figures

EXPANSION SLEEVE

BACKGROUND OF THE INVENTION

The present invention relates to panel attachment members and more particularly concerns an expansion sleeve which is more readily and securely affixed to a relatively thin panel member or plate.

Various types of blind rivets, expansion sleeves and other types of expandable fasteners have been employed for many years for attachment of objects to thin panels or plates. These devices often include elements adapted to extend radially outwardly of the fastener along the interior of the panel or plate.

Where the structure to which the fastener is to be attached is solid, or backed with a solid material such as a solid concrete wall or member or roof structure, expansion sleeves are secured by means of the frictional force exerted between internally expanded portions and the relatively thick solid structure.

Many types of structural panels are composite structures, formed of a core or backing material and an outer cover or facing sheet. For example, in a construction known as Robinson Decking, which is commonly used for lightweight flooring, a corrugated rigid sheet metal panel is employed as the bottom facing sheet of a floor upon which a lightweight porous concrete is poured to provide a suitable floor support. The corrugated sheet metal panel becomes the ceiling for areas below the decking and is used to support various types of suspended structures such as conduits, water pipes, electrical lines, or platforms for suspended equipment such as air conditioners, fans, heaters or the like.

The lightweight concrete of such composite structural panels does not have sufficient strength to hold a conventional expansion sleeve since such concrete is readily crushed by pressures that would be exerted by such a sleeve. Yet, the presence of such concrete will prevent the use of conventional thin wall fastening devices that require radial expansion along the interior of a plate or thin wall panel. Moreover the upper surface of the concrete decking must remain undisturbed, entirely free of holes for fasteners.

It is possible to pre-drill holes in the corrugated sheet metal of such composite decking and insert headed bolts into such holes to hang from the decking before the pouring of the concrete. However, this arrangement requires that all of the necessary and desired support points be located before the pouring of the concrete and, further, does not permit any change in location of points or addition of other supported equipment without drilling through the upper surface of the concrete. It is often desirable to locate equipment and devices to be supported from such overhead composite decking after the decking has been completed, but no simple or adequate techniques for attachment of devices to such decking are presently available.

Accordingly, it is an object of the present invention to minimize or avoid above-mentioned problems.

SUMMARY OF THE INVENTION

In carrying out principles of the present invention in accordance with a preferred embodiment thereof an expansion sleeve is formed as an externally threaded hollow member having an inwardly projecting shoulder within its bore that provides a smaller opening. A nut is mounted on the threaded sleeve so that, after the sleeve has been expanded by forcing an expanding tool into the smaller sized opening, the nut may be tightened to draw the sleeve outwardly of a panel member into which it has been inserted and to force the expanded portion of the sleeve against one side of the panel member.

According to another feature of the invention an inner end of the sleeve bore is threaded and a threaded hanger rod is inserted from the outer end of the sleeve into threaded engagement with the interior threads, extending past the expanded smaller sized opening to resist collapse of this portion of the sleeve. The hanger rod may be tensioned so as to draw the inner end of the sleeve toward the panel.

DETAILED DESCRIPTION

Figure 1:
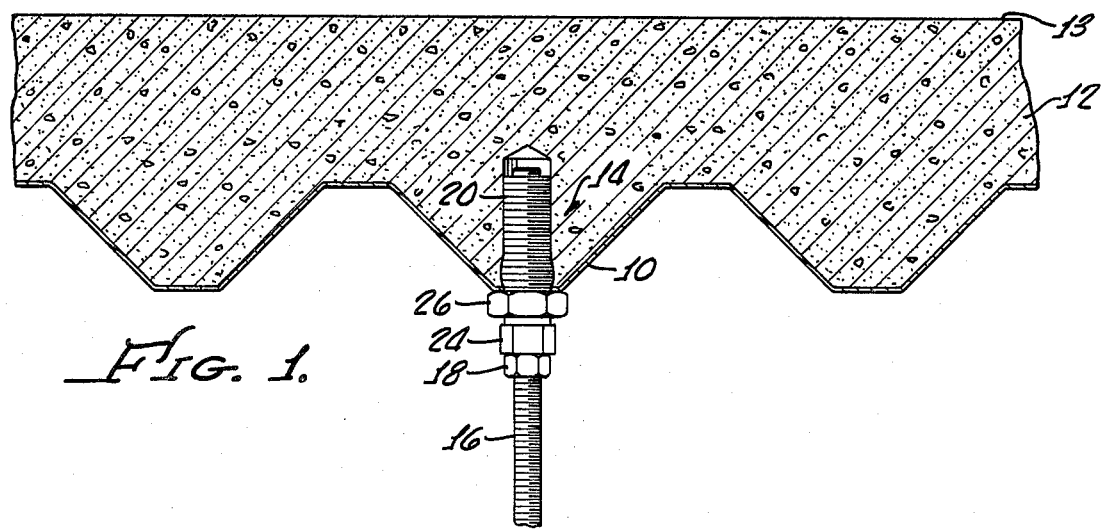
FIG. 1 illustrates an expansion sleeve embodying principles of the present invention secured to a composite deck.

The present invention may be employed for connection to many different types of thin walled panels, sheet structures or plate members whether or not such members form a part of a hollow structure or are backed by a solid material. Nevertheless, since the sleeve of this invention has been initially designed for application to a composite structure comprising a rigid thin wall backed by a relatively lightweight soft and porous material it is illustrated in FIG. 1 in use with such a structure.

A section of a common composite decking commonly termed "Robinson Decking" includes a continuous corrugated sheet metal plate or panel 10 upon which has been poured a lightweight concrete 12. The composite structure forms a decking in which the sheet metal panel 10 comprises the overhead surface or ceiling of an area below the decking. The upper surface of the decking is formed by the upper surface 13 of the concrete. It is preferred not to disturb surface 13. In order to secure hangers for pipes, conduit, electrical cables, apparatus or equipment support platforms and the like to the decking so that such items may be suspended therefrom, a plurality of expansion sleeves such as that indicated at 14 are secured to the sheet metal panel 10, extending through blind holes drilled from below through the decking and partly into the backing concrete. Each expansion sleeve has a threaded hanger rod, such as rod 16, inserted therein and locked by means of a lock nut 18.

Figure 2:
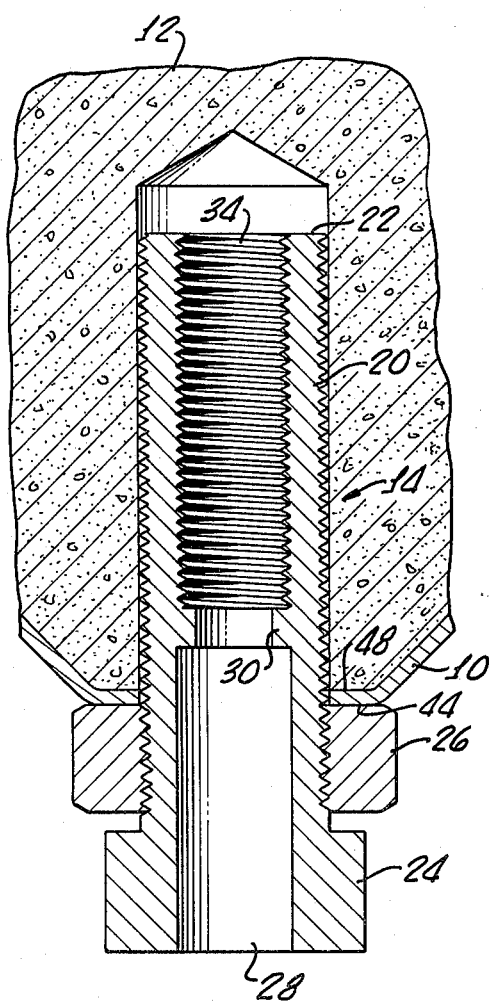
FIG. 2 shows the expansion sleeve inserted into a blind hole, but not yet expanded.

A longitudinal cross section of an expansion sleeve embodying principles of this invention, before expansion, is illustrated in FIG. 2. The expansion sleeve comprises a hollow threaded body 20, externally threaded for its full length from an inner end 22 to an outer end upon which is formed a tool receiving surface in the form of an enlarged hexagonal head 24. A jamb nut 26 is threaded upon the external threads of the sleeve and positioned close to the outer end and tool receiving head 24.

The sleeve has an internal bore which is smooth, unthreaded and of a circular cylindrical configuration for a portion 28 extending from and through the outer headed end 24 to an intermediate portion of the sleeve at which is formed an inwardly projecting annular shoulder 30. The annular shoulder 30 defines an opening that is smaller than the diameter of the smooth bore portion 28. The inner end of the hollow sleeve, between the shoulder 30 and inner end 22, is internally threaded and has a diameter, at the roots of the threads, substantially equal to the diameter of the smooth bore portion 28. Accordingly, a rod to be threadedly engaged with the internal threaded portion 34 will readily pass through the smooth bore portion 28.

Figure 3:
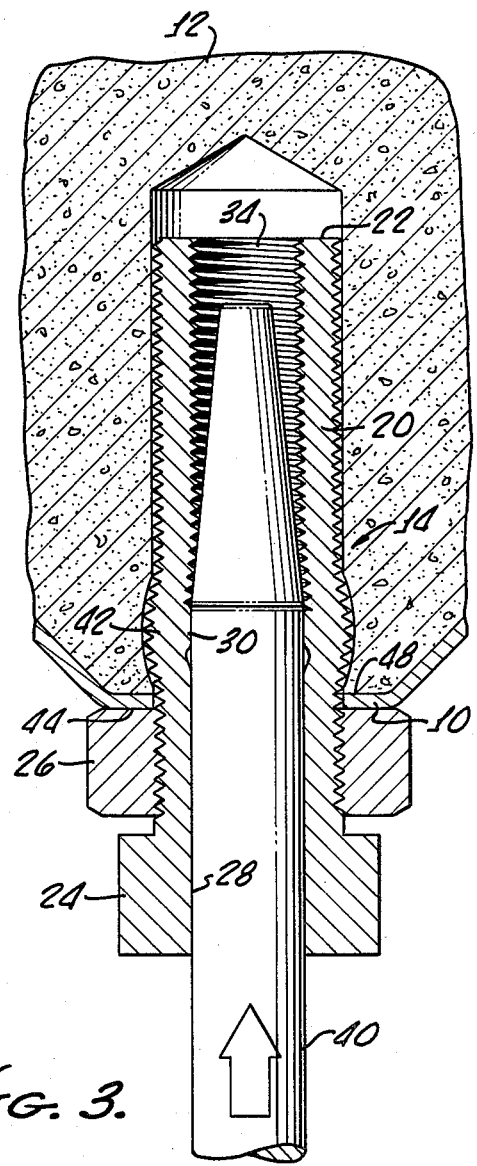
FIG. 3 shows the sleeve with a drift pin in position, expanding an intermediate portion of the sleeve.
Figure 4:
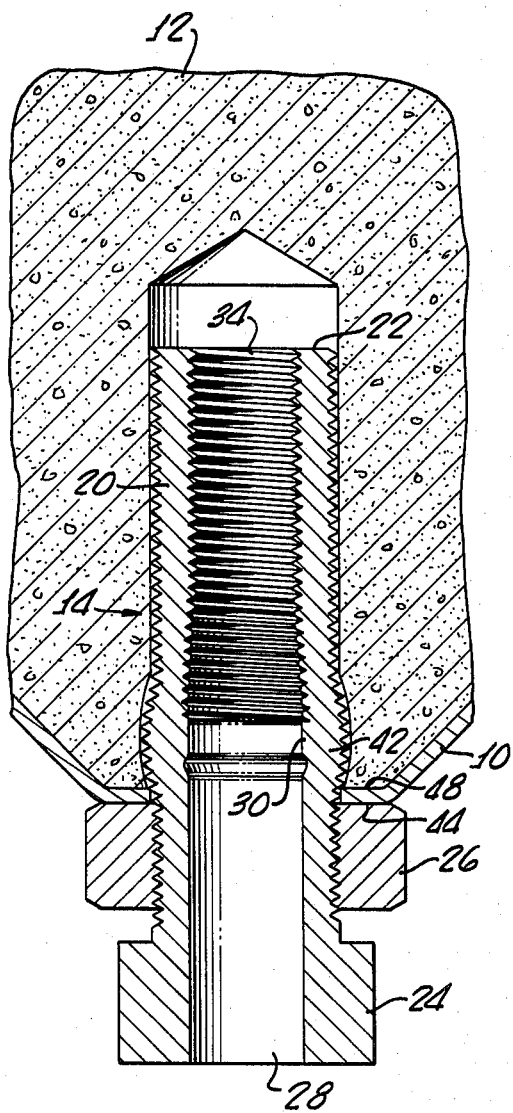
FIG. 4 shows the expanded sleeve and panel after a jamb nut has been tightened to pull the sleeve outwardly.
Figure 5:
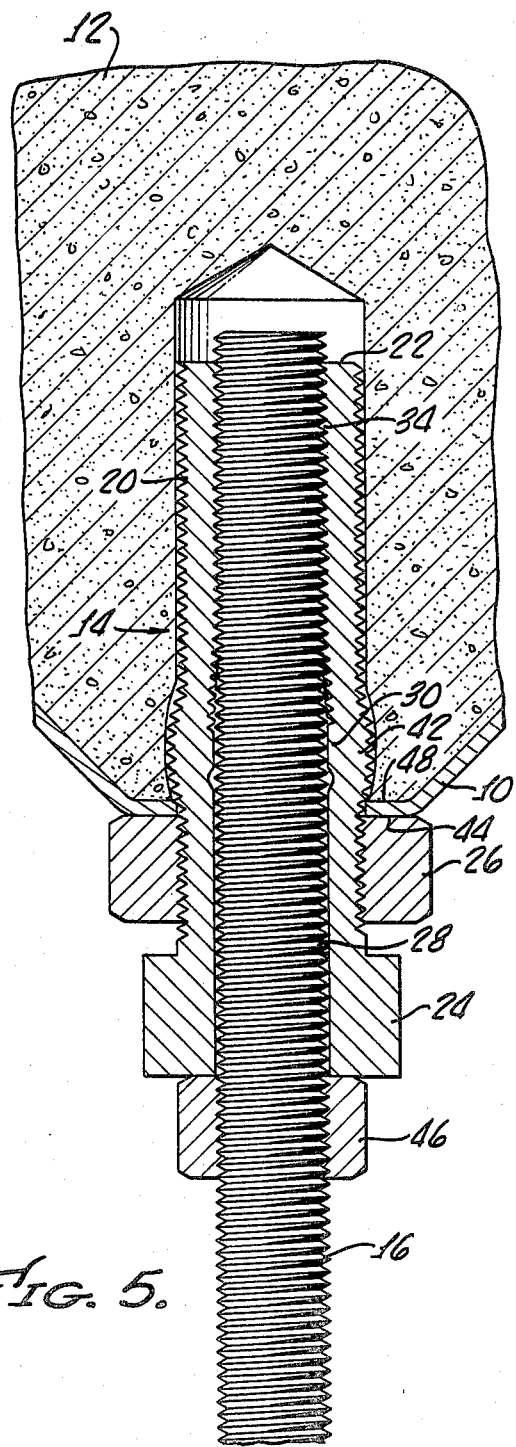
FIG. 5 shows the expansion sleeve and panel with a threaded hanger rod inserted into the sleeve and its lock not tightened.

FIGS. 3, 4 and 5 illustrate several steps in the securing of the described expansion sleeve to a panel or plate member such as the corrugated facing sheet 10 of FIG. 1. As previously mentioned a hole is drilled through the panel 10 and partially through the backing concrete to the external diameter of the sleeve shank. The sleeve is inserted into the hole until jamb nut 26, which is positioned closely adjacent enlarged outer end portion 24, abuts the exterior surface of the panel 10. Now a tapered expansion tool such as a drift pin 40 (FIG. 3) is driven into the sleeve through the smooth bore outer end and through the smaller sized opening in the annular shoulder 30. Drift pin 40 has a diameter substantially equal to the diameter of the smooth bore portion 38 and thus will expand the interior of the sleeve at the shoulder 30. This also expands the sleeve wall in the vicinity of the shoulder. The sleeve bore is expanded until it is large enough to allow the drift pin 40 to pass. Accordingly, the decreased diameter portion of the intermediate section of the sleeve now has been enlarged to accept a rod that can be threaded into the outer internal threaded portion 34. Moreover, the intermediate section of the sleeve has been expanded to produce an outer bulge 42 so that this intermediate portion of the sleeve now has an external diameter greater than the diameter of the hole in the panel 10 into which the sleeve has been inserted.

The tapered expansion tool 40 is now removed and jamb nut 26 is tightened upon the exterior threads of the sleeve. The nut bears against the outer surface 44 of panel 10 and draws the expansion sleeve outwardly of the panel to forceably drive the expanded portion, bulge 42, of the sleeve against the interior surface 48 of the panel. The sleeve is now locked in place to and within the hole in the panel (FIG. 4).

The sleeve is held to the panel by means of the clamping action which presses the edges of the hole in the panel between the jamb nut 26 on the outer surface and the expanded intermediate sleeve portion 42 on the inner panel surface. Nevertheless, this clamping action is further increased and the sleeve is even more firmly secured by both the application of the threaded hanger rod and also by the application of any force or weight exerted upon or by the threaded hanger rod. Threaded hanger rod 16, having a diameter just equal to or less than the smooth internal unthreaded diameter of bore portion 28, is inserted into the sleeve from the outer end thereof, through the unthreaded bore portion and past the deformed and outwardly displaced shoulder 30, and threadedly engaged with the interior sleeve threads 34. The opening in the shoulder 30 has been enlarged to an amount sufficient to allow passage of the hanger rod 16 but yet the exterior of the hanger rod is close to the shoulder so that any tendency of the enlarged intermediate portion of the sleeve to collapse or return to its initial configuration (the configuration shown in FIG. 2) is resisted by the threaded hanger rod which has been inserted into and through the now enlarged shoulder opening.

A lock nut 46 (FIG. 5) is then threaded upon hanger rod 16 and drawn down upon the rod until the lock nut bears against the outermost end of the enlargement 24 of the sleeve. Tightening this lock nut open the rod 16 tends to draw the inner end of the sleeve outwardly toward the interior surface of the panel. A tensile force is established in the hanger rod, which is tensioned between lock nut 46 and threaded sleeve end 34, and this tension exerts a compressive force upon the sleeve between its inner and outer ends. This compressive force tends to increase the outward bowing of the expanded sleeve portion 42. Further, when an object to be supported from the decking is secured to the threaded hanger rod, the weight of the object will further tension rod 16, tending to draw the entire assembly outwardly of the panel 10 and this weight then further jams the expanded sleeve portion against the interior of the panel.

Thus objects may be securely connected to and suspended from the panel, at locations determined even after the concrete is poured, and without putting holes entirely through the concrete.

The foregoing detailed description is to be clearly understood as given by way of illustration and example only, the spirit and scope of this invention being limited solely by the appended claims.

What is claimed is:

1. An expansion sleeve comprising
   a hollow elongated member having inner and outer ends and a bore,
   projection means formed in said bore between said sleeve ends and projecting inwardly to form an opening smaller than the diameter of said bore, whereby a tapered tool may be driven into said bore and through said opening of said projection means to expand a portion of said sleeve adjacent said projection means,
   means for pulling said sleeve outwardly of a sheet member having a hole through which said sleeve has been inserted to press said expanded sleeve section against said sheet member,
   said sleeve being internally threaded for at least a portion of its length between said projection means and said inner end, whereby said opening in said projection means may be expanded by said tool to the size of said bore and an externally threaded hanger may be inserted through said outer end into threaded engagement with said internal threaded portion of said sleeve to maintain said expanded sleeve portion in expanded condition and to urge said inner end and said expanded sleeve portion against said sheet.

2. The sleeve of claim 1 wherein an outer portion of said bore, between said projection means and said outer end is smooth and unthreaded.

3. The expansion sleeve of claim 1 wherein said means for pulling said sleeve to press said expanded sleeve portion against said sheet member, comprises external threads on said sleeve adjacent said outer end and a nut threaded on said external threads and adapted to engage the outer side of said sheet member, whereby threadedly advancing said nut upon said external threads will urge said sleeve outwardly of said sheet member.

4. The expansion sleeve of claim 2, including means on said outer sleeve end for receiving a rotation restraining tool to facilitate advancement of said nut along said external threads.

5. The sleeve of claim 4 wherein said projection means comprises an inwardly projecting annular shoulder.

6. An expansion anchor assembly comprising
an elongated hollow bolt having inner and outer ends and a tool receiving portion formed on said outer end,
said bolt being externally threaded from said inner end to an area adjacent said tool receiving portion,
a nut threaded on said external threads and positioned adjacent said tool receiving portion,
said bolt having a bore extending from said outer end through said tool receiving portion toward said inner end of said bolt,
said bore having an area of decreased diameter at an intermediate portion of said bolt, and
internal threads formed in said bore between said inner end and said portion of decreased diameter.

7. The assembly of claim 6 wherein an outer portion of said bore, between said area of decreased diameter and said outer end, is smooth and unthreaded, whereby a drift pin may be inserted through said smooth outer portion to expand said area of decreased diameter.

* * * * *